United States Patent
Nishimura et al.

(10) Patent No.: US 7,277,125 B2
(45) Date of Patent: Oct. 2, 2007

(54) IMAGE PROCESSING SYSTEM, METHOD AND PROGRAM FOR IMAGE SENSING USING PLURAL IMAGE SENSING DEVICES, WIRELESSLY TRANSMITTING PLURAL IMAGE DATA AND PROCESSING THE IMAGE DATA

(75) Inventors: Naoki Nishimura, Tokyo (JP); Kenji Saitoh, Tochigi (JP)

(73) Assignee: Canon Kabushki Kaisha, Tokyo (JP)

(*) Notice: Subject to any disclaimer, the term of this patent is extended or adjusted under 35 U.S.C. 154(b) by 768 days.

(21) Appl. No.: 10/744,753

(22) Filed: Dec. 23, 2003

(65) Prior Publication Data
US 2004/0165076 A1    Aug. 26, 2004

(30) Foreign Application Priority Data
Dec. 27, 2002   (JP) ............................. 2002-382277
Dec. 18, 2003   (JP) ............................. 2003-421354

(51) Int. Cl.
*H04N 5/225* (2006.01)
*H04N 13/02* (2006.01)
*H04N 15/00* (2006.01)
*G09G 5/00* (2006.01)

(52) U.S. Cl. .............. 348/218.1; 345/630; 348/47; 348/376

(58) Field of Classification Search .............. 348/46, 348/47, 48, 62, 63, 373, 376, 218.1; 382/199, 382/201; 345/630
See application file for complete search history.

(56) References Cited

U.S. PATENT DOCUMENTS

| | | | | |
|---|---|---|---|---|
| 6,141,036 A | * | 10/2000 | Katayama et al. | 348/47 |
| 6,307,526 B1 | * | 10/2001 | Mann | 345/8 |
| 6,445,814 B2 | * | 9/2002 | Iijima et al. | 382/154 |
| 6,563,532 B1 | * | 5/2003 | Strub et al. | 348/158 |
| 6,621,932 B2 | * | 9/2003 | Hagai et al. | 382/233 |
| 6,734,914 B1 | * | 5/2004 | Nishimura et al. | 348/375 |
| 7,206,022 B2 | * | 4/2007 | Miller et al. | 348/376 |
| 2002/0061194 A1 | * | 5/2002 | Wu et al. | 396/324 |
| 2002/0080094 A1 | * | 6/2002 | Biocca et al. | 345/8 |
| 2002/0122113 A1 | * | 9/2002 | Foote | 348/48 |
| 2003/0112335 A1 | | 6/2003 | Strandwitz et al. | |
| 2003/0133008 A1 | * | 7/2003 | Stephenson | 348/47 |
| 2003/0152272 A1 | * | 8/2003 | Venable | 382/199 |

FOREIGN PATENT DOCUMENTS

JP             07234447 A   *   9/1995

OTHER PUBLICATIONS

Seales W. B., et al.: "Distributed Wireless Stereo Reconstruction" Aerospace Conference, 1997. Proceedings., IEEE Snowmass at Aspen, Co., USA Feb. 1-8, 1997; New York, NY, USA IEEE, US, Feb. 1, 1997, pp. 149-156.

(Continued)

*Primary Examiner*—Lin Ye
*Assistant Examiner*—Jason Whipkey
(74) *Attorney, Agent, or Firm*—Cowan, Liebowitz & Latman, P.C.

(57) ABSTRACT

An image processing system or image processing method for performing image sensing by an image sensing unit having plural image sensing devices then outputting plural image data, wireless-transmitting the plural image data, and generating a combined image based on the wireless-transmitted plural image data.

4 Claims, 15 Drawing Sheets

OTHER PUBLICATIONS

Neuvo Y., et al.: "Wireless Meets Multimedia—New Products and Services" Proceedings 2002 International Conference on Image Processing. ICIP 2002. Rochester, NY, Sep. 22-25, 2002, International Conference on Image Processing, New York, NY: IEEE, US, vol. 2 or 3, Sep. 22, 2002, pp. 1-4.

Mann, S.: "Further Developments on 'Headcam': Joint Estimation of Camera Rotation + Gain Group of Transformations for Wearable Bi-Foveated Cameras" Acoustics, Speech, and Signal Processing, 1997. ICASSP-97., 1997 IEEE International Conference on Munich, Germany, Apr. 21-24, 1997; Los Alamitos, CA, USA, IEEE Comput. Soc, US, Apr. 21, 1997, pp. 2909-2912.

Mayol, W.W., et al: "Towards Wearable Active Vision Platforms" Systems, Man, and Cybernetics, 2000 IEEE International Conference on Nashville, TN, USA, Oct. 8-11, 2000; Piscataway, NJ, USA, IEEE, US, Oct. 8, 2000, pp. 1627-1632.

Inamoto, N., et al: "Intermediate View Generation of Soccer Scene from Multiple Videos" Pattern Recognition, 2002. Proceedings. 16th International Conference on Quebec City, Que., Canada, Aug. 11-15, 2002; Los Alamitos, CA., USA, IEEE Comput. Soc, US , Aug. 11, 2002, pp. 713-716).

Qian Chen, et al.: "Image Synthesis From A Sparse Set of Views" Proceedings Visualization '97. Phoenix, AZ., Oct. 19-24, 1997; Annual IEEE Conference On Visualization, Los Alamitos, CA: IEEE Computer Soc, US, vol. Conf. 8, Oct. 19, 1997, pp. 269-275.

* cited by examiner

IMAGE PROCESSING SYSTEM, METHOD AND PROGRAM FOR IMAGE SENSING USING PLURAL IMAGE SENSING DEVICES, WIRELESSLY TRANSMITTING PLURAL IMAGE DATA AND PROCESSING THE IMAGE DATA

FIELD OF THE INVENTION

The present invention relates to an image processing system, method and program for performing image sensing, wireless communicating image information and processing the image information.

BACKGROUND OF THE INVENTION

In recent years, with widespread use of digital cameras and video cameras, there are many opportunities of image sensing by camera to record memorial events such as an athletic meet, a wedding ceremony and a travel, and to pick up scenes in ordinary daily life. Particularly, such opportunities of image sensing are increased by the progress in downsizing of digital cameras.

In daily life, it is often difficult to remember people to meet. Further, it may be desired to record a route of visit to an unknown town.

However, in many cases, it is impossible to record daily life since it is offensive for people to be photographed with a camera, and it is troublesome to carry the camera, and further, there is often no time to perform image sensing.

In this manner, there is a need to save images of things seen in daily life, without performing image sensing with a camera. However, none of cameras which have been developed up to now can respond to such need.

SUMMARY OF THE INVENTION

The present invention relates to an image processing system or an image processing method for performing image sensing with an image sensing unit having plural image sensing devices and outputting plural image data, wireless-transmitting the output plural image data, and generating a combined image based on the wireless-transmitted plural image data.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1A:
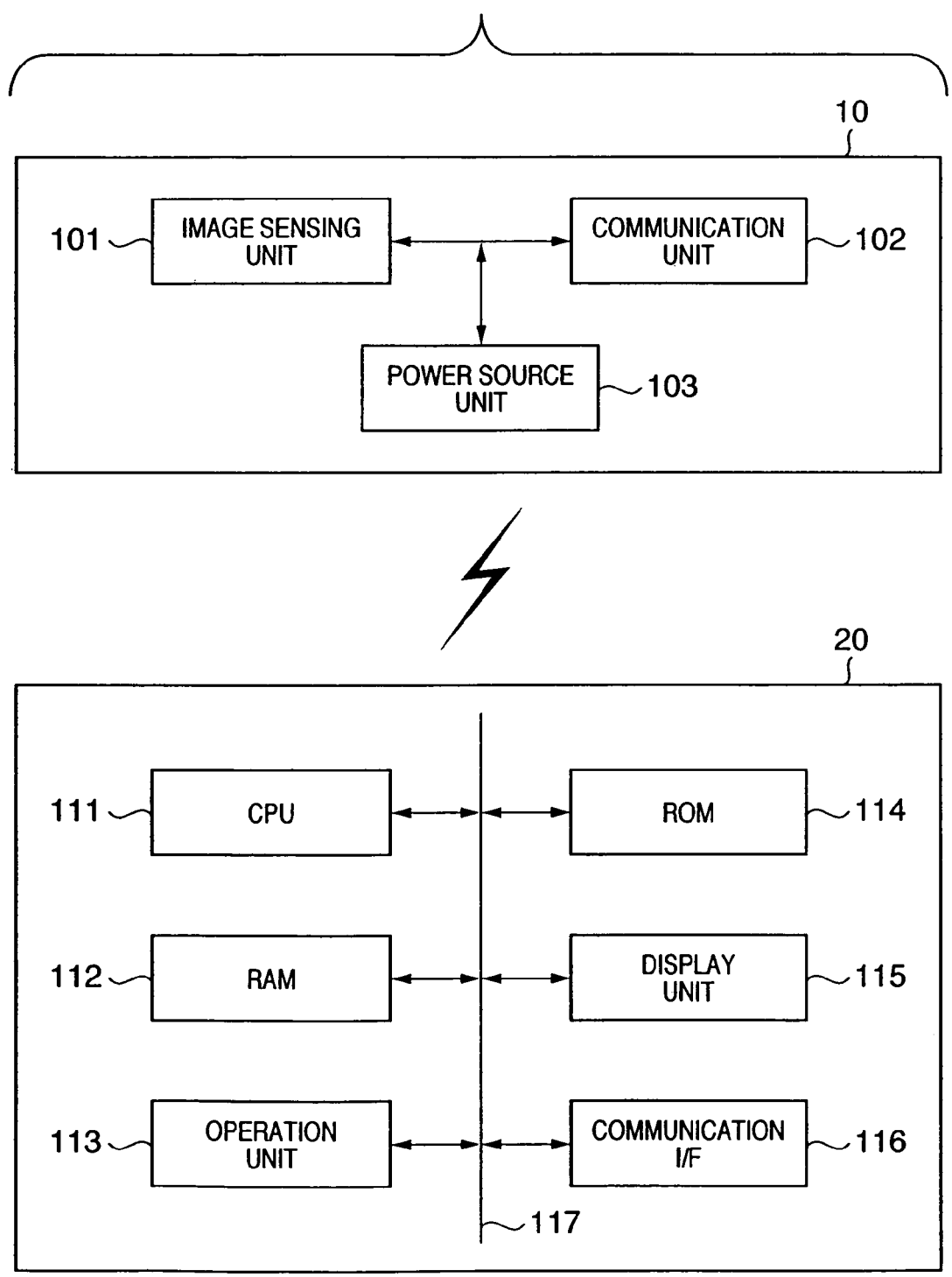
FIG. 1A is a block diagram showing an example of hardware construction of an image processing system according to embodiments of the present invention.
Figure 1B:
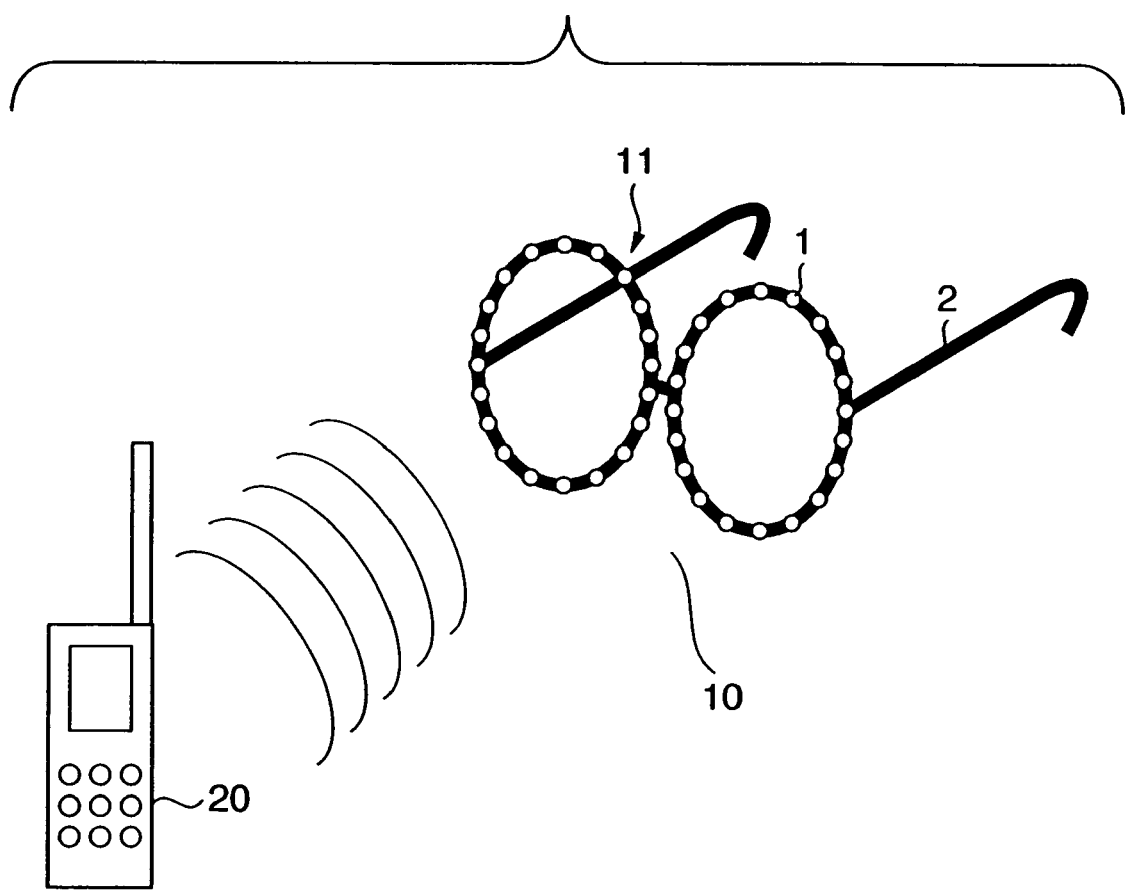
FIG. 1B is an explanatory view of an arrangement of the image processing system.

FIG. 1A is a block diagram showing an example of hardware construction of an image processing system according to a first embodiment of the present invention. FIG. 1B is an explanatory view of an arrangement of the image processing system. As shown in FIGS. 1A and 1B, the image processing system mainly has a wireless image sensing apparatus 10 and a main base 20.

The wireless image sensing apparatus 10 is constituted with an image sensing unit 101, a communication unit 102 and a power source unit 103 mounted on a base member.

The image sensing unit 101 has a large number of image sensing wireless devices 1 as very small ball-shaped wireless image sensing devices. For example, in the system arrangement as shown in FIG. 1B, the image sensing wireless devices 1 are arranged on a frame of glasses 11 as a base member. In the image sensing unit 101, image sensing is performed on an object observed by a user wearing the wireless image sensing apparatus 10 (glasses 11 in FIG. 1B) by the respective image sensing wireless devices 1 in the respective positions.

The obtained images are transmitted to the communication unit 102 via a line connecting the respective image sensing wireless devices 1 with the communication unit 102.

The glasses 11 may be nearsightedness spectacles, farsightedn ss spectacles, bifocals, plain glasses, sunglasses or the like. Further, for amblyopic or blind persons, it may be arranged such that an image obtained by the image sensing wireless device 1 is recognized by the main base 20 and the user is notified of image information by an alarm or the like. For example, it may be arranged such that an image of dangerous step portion or a roadway portion is determined by the main base 20 and the user wearing the glasses 11 is notified of the portion. Further, the system is applicable to a monitoring system for senile dementia recently attracting public attention. In a case a person who hangs about wears the glasses 11, his/her family can obtain and appropriately meet the situation around the person at any time.

Figure 5:
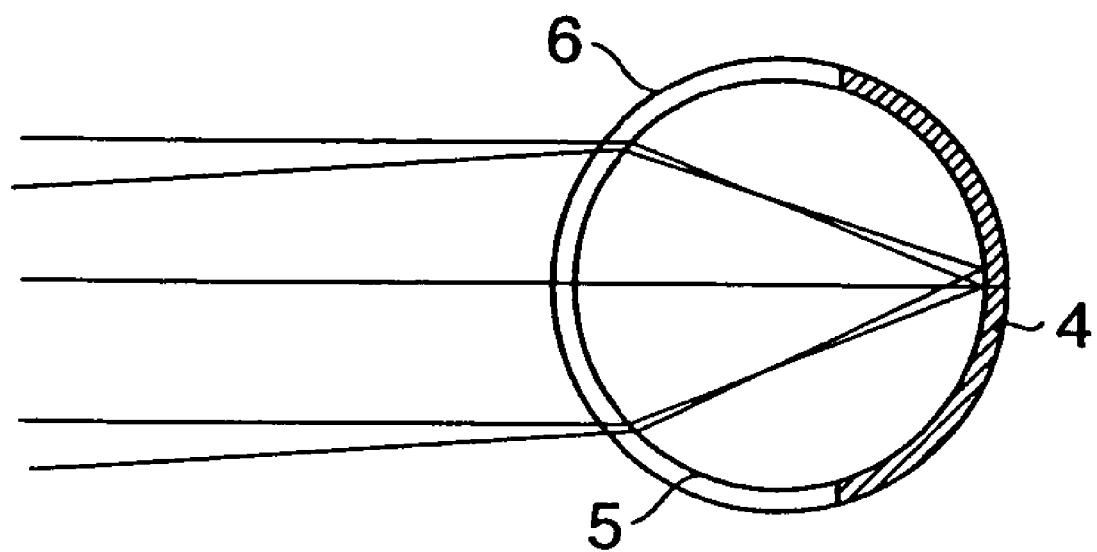
FIG. 5 is a schematic diagram showing an example of the structure of the image sensing wireless device 1.

FIG. 5 is a schematic diagram showing an example of the structure of the image sensing wireless device 1 used in the wireless image sensing apparatus 10. The image sensing wireless device 1 is a sensor-integrated type device using a very small ball lens. In each ball having a diameter of 1 mm, a spherical sensor 4 which is a 10,000-pixel CCD or CMOS sensor is provided on a rear surface of a spherical lens 5, and a color filter 6 is provided on a front surface. The size of 1 pixel is about 2 μm. Even though the number of pixels of 1 image sensing wireless device is 10,000, if 100 image sensing wireless device, for example, are provided on the wireless image sensing apparatus 10 such as the glasses 11 in FIG. 1A, a high quality image equivalent to an image obtained by a 1,000,000 pixel image sensing device can be obtained. This arrangement of multiple image sensing wireless devices can be realized by forming small sensing devices of 1 mm.

Note that in the present embodiment, to utilize the plural image sensing wireless devices 1 as image sensing systems, the following method for optical-axis correction may be employed. First, optical axis alignment can be made by mechanical arrangement. Respective parts are manufactured with predetermined accuracy (within an allowable range of the shift of optical-axis of each pixel of each image sensing system from another image sensing system, 1-pixel), and they are assembled. Next, the respective image sensing wireless devices 1 are arranged on an accessory such as glasses or the like, then image sensing is performed on a calibration chart as an object, and the optical axes of the respective image sensing systems and rotational directions of the image sensing devices are obtained. Further, the directions of the respective image sensing systems may be obtained from plural feature point information of the obtained images. Since determination of focus positions and magnification, and color adjustment are previously performed in the respective image sensing systems, in addition to correction of optical axes, images obtained from the respective image sensing systems can b appropriately processed.

The communication unit 102, having a wireless communication unit and an antenna, functions as wireless communication means for transmitting images obtained by the image sensing unit 101 to the main base 20.

In FIG. 1B, the communication unit 102 is provided in a bow of the glasses 11. The size of the communication unit 102 may be somewhat larger than the image sensing wireless device 1. Especially, the antenna may have a sufficient size as long as it can be incorporated in the bow of the glasses 11. For example, it may be arranged such that a part of the bows of the glasses 11 is a metal line as a monopole antenna. For communication with the main base 20 using e.g., an electromagnetic wave ¼ of communication wavelength, 2.45 GHz, the length of the antenna is set to 3 cm. Note that considering load upon wearing the glasses, it is preferable that the communication unit 102 is a light weight unit.

The power source unit 103 may be a device to generate electric power by wireless supply from the main base 20, or may be a small electric cell as the power source of the wireless image sensing apparatus 10 such as a Li battery, a solar battery, fuel battery, a battery to convert vibration such as sound or pressure change to electric energy, or a battery utilizing the difference between human body temperature and environmental temperature.

The main base 20 is a base station terminal to control the operation of the wireless image sensing apparatus 10 by wireless communication with the wireless image sensing apparatus 10, and to receive images obtained by the image sensing wireless devices 1. The main base 20 may be installed as a specialized terminal, or may be a wrist watch type device, or may be a part of an accessory such as a ring. Further, the functions of the main base 20 may be loaded on a cellular phone or PHS terminal, a PDA or the like always used by a user. Further, it may be arranged such that data received from the wireless image sensing apparatus 10 or data processed by the main base 20 may be transmitted by utilizing the communication function to an external device. For example, in a case where an image obtained by a user's friend while traveling is displayed on a personal computer on a network via a cellular phone, the feeling of the friend can be understood in realtime at home.

In the main base 20, numeral 111 denotes a CPU which controls the entire main base using programs and data stored in a RAM (Random Access Memory) 112 and a ROM (Read Only Memory) 114, and performs image combining processing using images obtained by the wireless image sensing apparatus 10. The RAM 112 has an area in which the program stored in the ROM 114 is read and a work area used by the CPU 111 upon execution of various processing.

Numeral 113 denotes an operation unit to function as input means for receiving the user input. The operation unit has input buttons for issuance of image sensing instruction to the wireless image sensing apparatus 10 and operations of the main base 20. The ROM 114 holds a program for controlling the entire main base 20 (e.g., a boot program for the main base 20), an application program for generation of combined image and the like. Numeral 115 denotes a display unit as a display screen comprised of a liquid crystal display or the like, to display, e.g., a combined image generated by the main base 20. Numeral 116 denotes a communication I/F (interface) which functions as an interface of communication with the wireless image sensing apparatus 10. Further, the communication I/F 16 may function as an interface for connection with an external device (e.g., a host computer or a printer) other than the wireless image sensing apparatus 10 or a network such as a LAN or the Internet.

Note that image combining processing performed by the main base 20 may be performed on a terminal on the network connected to the wireless image sensing apparatus 10 or the main base 20. However, it is preferable that the image combining processing is performed by the main base 20 as described above or on a terminal on the network connected to the main base 20 for weight reduction of the wireless image sensing 10.

Figure 2:
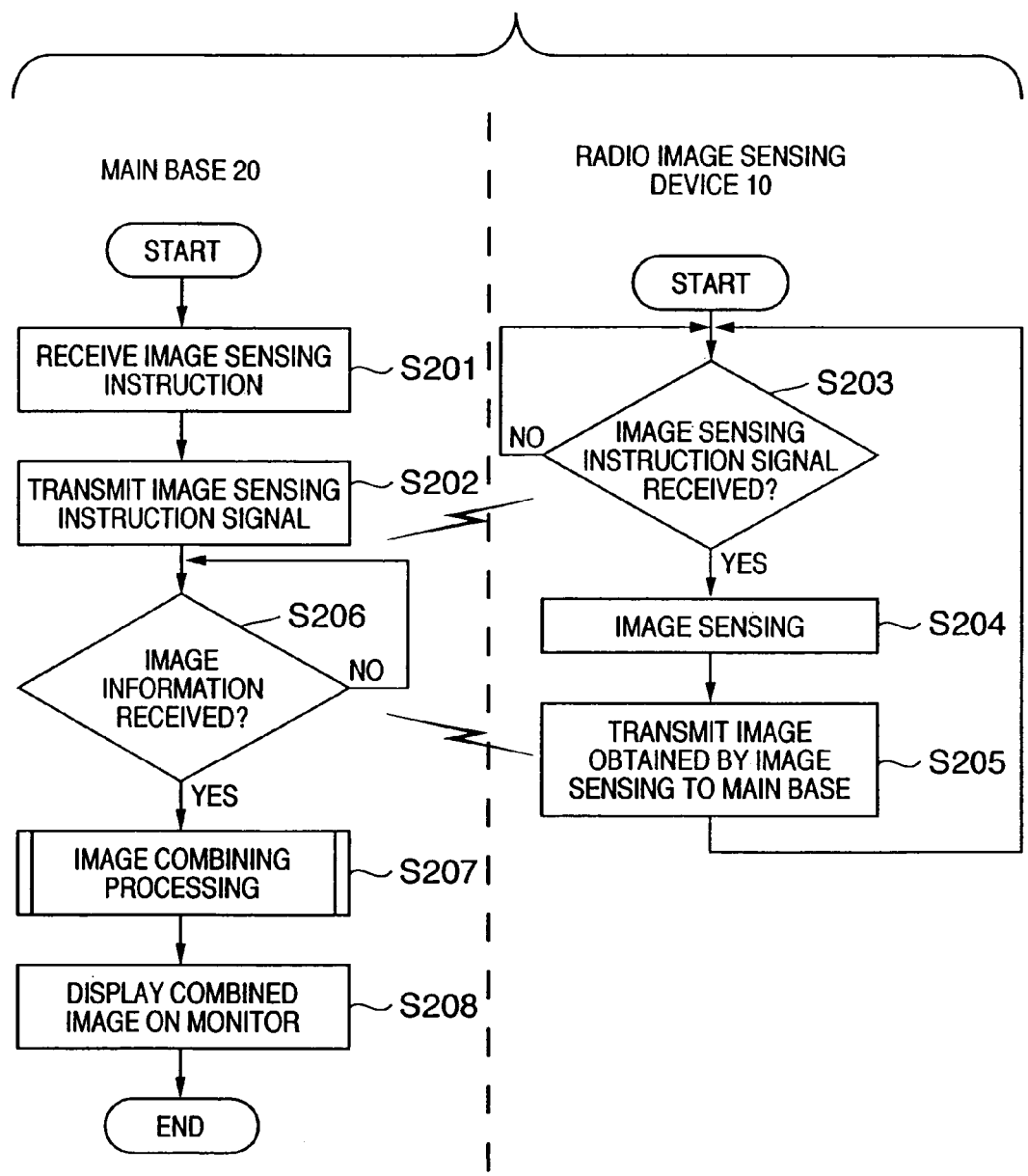
FIG. 2 is a flowchart showing processing in the image processing system according to the embodiments of the present invention.

FIG. 2 is a flowchart showing the flow of processing in the image processing system according to the present embodiment. First, in the main base 20, an image sensing instruction by the wireless image sensing apparatus 10 is received from the user (step S201). The image sensing instruction is issued by operating the operation unit provided in the main base 20. Further, in a case where the main base 20 has a voice input unit such as a microphone and the ROM 114 has a voice recognition processing application, the image sensing instruction may be received by voice input from the user.

Next, the main base 20 transmits an image sensing instruction signal to the wireless image sensing apparatus 10 to notify the wireless image sensing apparatus 10 of the reception of image sensing instruction from the user (step S202). Note that if electric power is supplied to the wireless image sensing apparatus 10 by wireless communication, electric power supply is performed at the same time of the transmission of the image sensing instruction signal.

On the other hand, in the wireless image sensing apparatus 10, it is monitored whether or not the image sensing instruction signal transmitted from the main base 20 has been received (step S203). If the image sensing instruction signal has been received, image sensing is performed by the image sensing wireless devices 1 (step S204). Note that if electric power is supplied to the wireless image sensing apparatus 10 by wireless communication, the wireless image sensing apparatus 10 is started in response to the electric power supply by wireless communication from the main base 20 and receives the image sensing instruction signal. When the image sensing has been completed, the wireless image sensing apparatus 10 transmits the obtained images to the main base 20 (step S205).

The information transmitted from the wireless image sensing apparatus 10 includes position information of each sensing wireless device 1, i.e., information indicating the position of image sensing wireless device 1 in the right/left side lens frame of the glasses 11, and image information obtained by image sensing. Further, it may be arranged such that the transmission information has, as packet data, the obtained image information as main data, and the position information of the image sensing wireless device 1 (e.g., if the image sensing wireless device 1 is an N-th device from the top in the clockwise direction in the right side frame of the glasses 11, information indicating "right, N") as a head r.

In the main base 20, transmission of image information from the wireless image sensing apparatus 10 is monitored (step S206). When all the images obtained by image sensing have been received, image combining processing is performed at step S207. Note that the time of image reception may be added as information on image sensing time to the combined image. The combined image generated by the image combining processing is displayed on the display unit 115 of the main base 20 (step S208).

Note that in the above description, the wireless image sensing apparatus 10 performs image sensing when it has received the image sensing instruction signal from the main base 20, however, it may be arranged such that the image sensing apparatus 10 performs image sensing even if the wireless image sensing apparatus 10 has not received the image sensing instruction. Further, it may be arranged such that the image combining processing is not performed by the main base 20, but the images are transmitted to an external device and freely edited/processed on the external device side.

Figure 3:
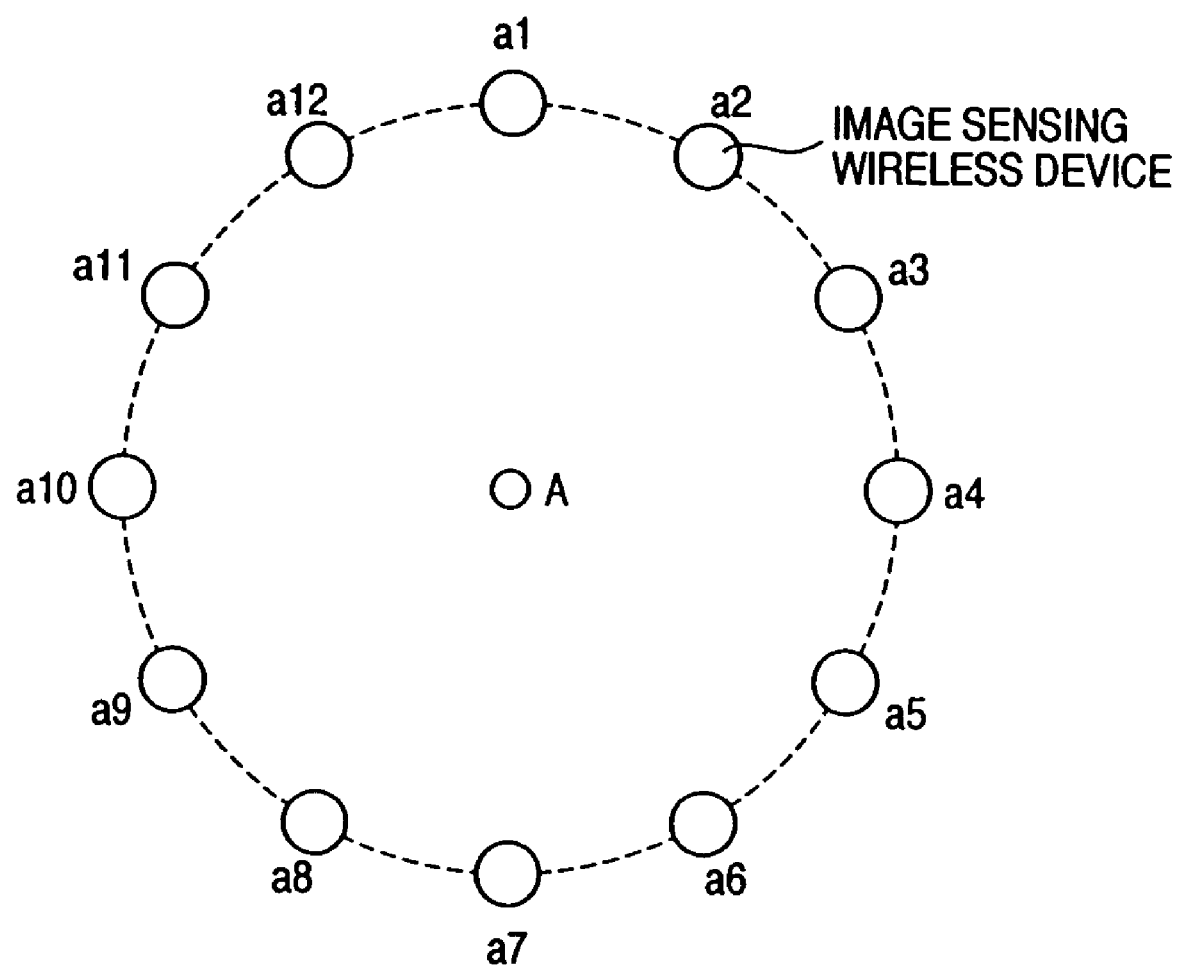
FIG. 3 is an explanatory view showing an arrangement of image sensing wireless sdevices 1 in a wireless image sensing apparatus 10 according to the embodiments of the present invention.

Next, processing of generating a combined image utilizing images obtained by the image sensing wireless devices 1 will be described. In the wireless image sensing apparatus 10, plural image sensing wireless devices 1 are provided mutually point-symmetrically with respect to the center of a circumference, such that signals from the respective image sensing wireless devices 1 are combined to one image. For example, as shown in FIG. 3, 12 image sensing wireless devices a1 to a12 may be provided point-symmetrically with respect to a central point A (e.g., the device a1 and the device a7 are point-symmetric with respect to the central point A). Note that this arrangement is merely an example but image sensing in any other arrangement may be performed.

By utilizing the above point-symmetrical arrangement, an image as if it is viewed from the central point A can be combined from images obtained by the respective image sensing devices. That is, in use of the glasses as the wireless image sensing apparatus 10 as shown in FIG. 1B, the combined image is generated in the central position of the lens of the glasses 11, i.e., the image is equivalent to an image obtained at a human eye level. Note that for the shake of simplification, the respective image sensing wireless devices 1 may be simply referred to as "devices a1 to a12".

Figure 4:
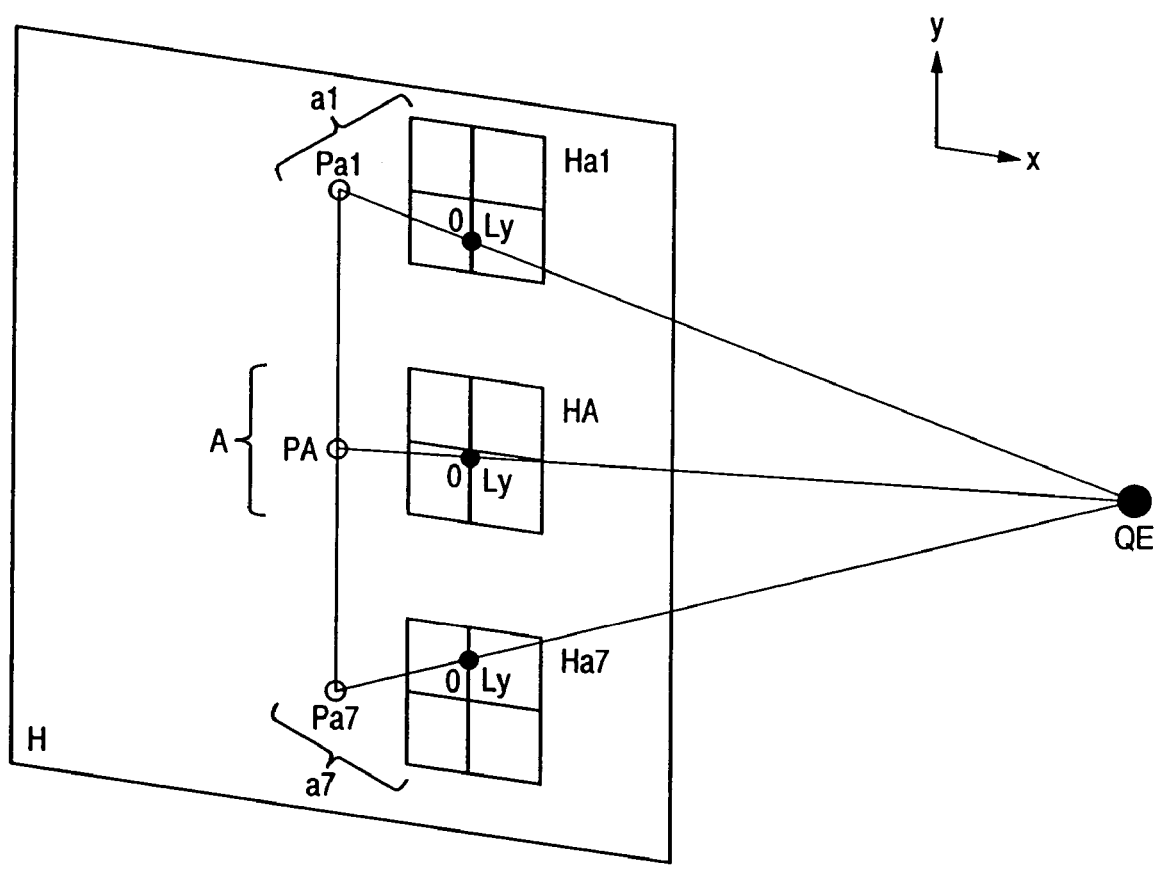
FIG. 4 is an explanatory view of image combining processing according to the embodiments of the present invention.
Figure 14:
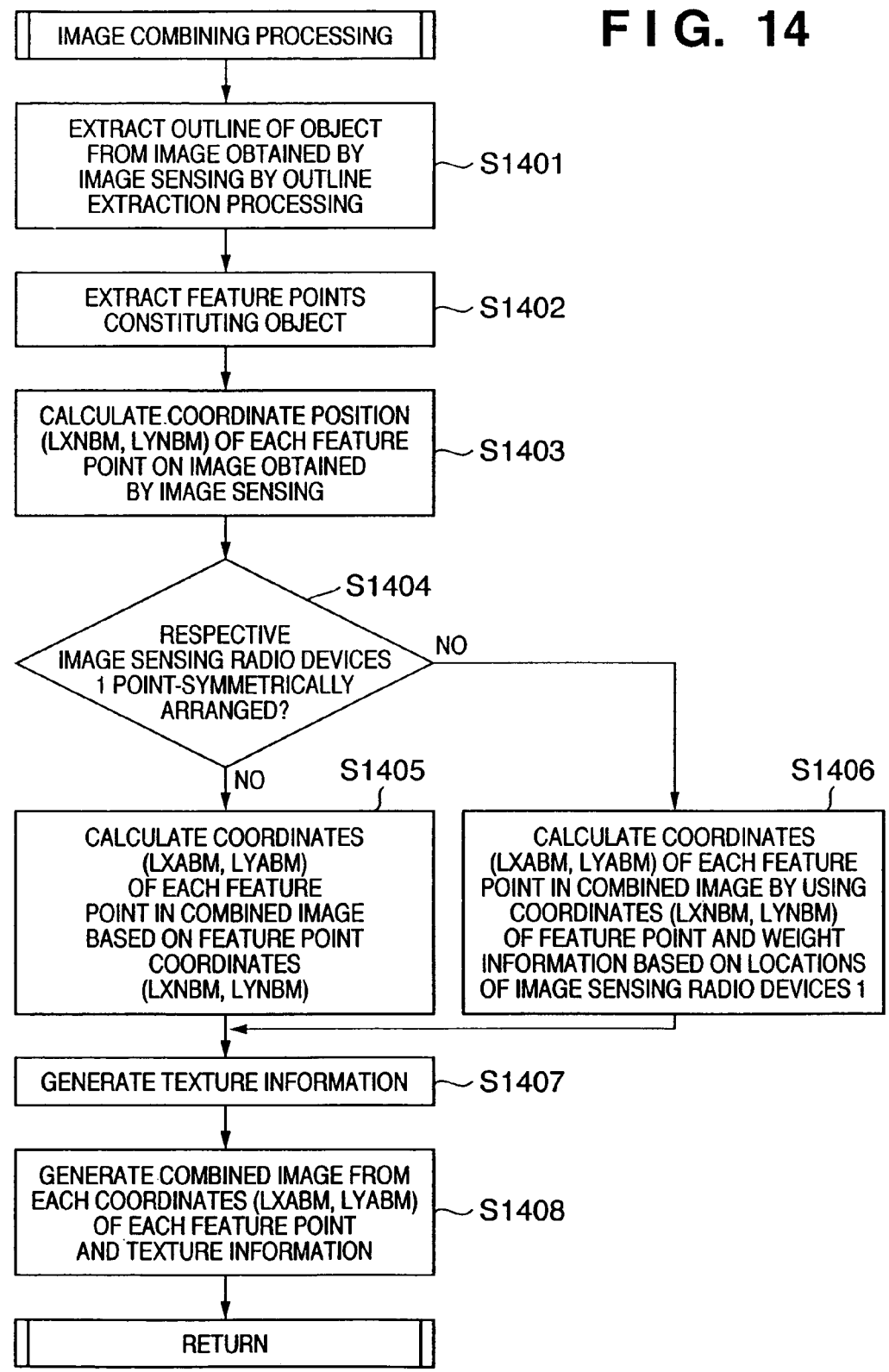
FIG. 14 is a flowchart showing an example of image combining processing according to the embodiments of the present invention.

Hereinbelow, the details of the image combining processing at step S207 of FIG. 2 will be described with reference to FIGS. 4, 10 and 14. First, a principle of combining images (obtained by image sensing) from the plural image sensing wireless devices 1 to generate an image (combined image) equivalent to an image obtained from a central point will be described. FIG. 4 is an explanatory view of the image combining processing in a case where a point QE is image-sensed from the devices a1 and a7. In the figure, the point A indicates a virtual view point as a view point where a combined image is obtained.

In FIG. 4, an image sensing position of the device a1 is Pa1, and an image obtained by the device a1 is Ha1; similarly, an image sensing position of the device a7 is Pa7, and an image obtained by the device a7 is Ha7. As shown in FIG. 4, the images obtained by the devices a1 and a7 are applied to a coordinate system with a y axis in a vertical direction and an x axis in a lateral direction.

The object QE is in a position x=0 in the images Ha1 and Ha7. That is, viewed from the device a1, the object QE is projected in a position y=Ly1 on the image Ha1. Similarly, viewed from the device a7, the object QE is projected in a position y=Ly7 on the image Ha7. At this time, as the devices a1 and a7 are positioned symmetrically with respect to the central point A, the coordinate point (LyA) of the object QE on the y axis on an image HA upon image sensing of the object QE from the central point A is obtained by the following expression.

$$LyA = Ly1 + Ly7 \qquad \text{[Expression 1]}$$

Accordingly, the object QE is projected in the position L=LyA on the image HA. In this example, the coordinate point of the object QE on the x axis is 0 for the sake of simplification, however, even if the coordinate of the QE is not x=0, the coordinate point (LxA) of the object QE on the x axis on the image HA upon image sensing of the object QE from the central point A can be obtained by calculation utilizing the x-axis coordinate value of the object QE on the images Ha1 and Ha7, LxA=Lx1+Lx7.

The coordinate calculation processing as above is applied to all the image sensing wireless devices point-symmetrically positioned with respect to the central point A, then the coordinates of the object QE in a combined image can be obtained from the x-axis and the y-axis coordinates in the images Ha1 to Ha12 in accordance with the following expressions.

$$LxA = \sum_{n=1}^{n=12} Lxn \qquad \text{[Expression 2]}$$

$$LyA = \sum_{n=1}^{n=12} Lyn \qquad \text{[Expression 3]}$$

As described above, the coordinates of the object QE (LxA, LyA) in the image HA upon image sensing of the object QE from the central point A can be determined based on the images obtained by the devices a1 to a12.

Similarly, in a case where other object than the object QE is image-sensed by the image sensing wireless devices 1, an image in a virtual view point from the central point A can be set, and images as if plural objects are viewed from the central point A are obtained.

Next, a method for generating a combined image by applying combining processing in the above point to images of three-dimensional object having a complicated shape will be described with reference to FIGS. 10 to 14. First, as shown in FIG. 10, a rectangular parallelopiped 1001 is image-sensed from the devices a1 to a12 circularly arranged with respect to the central point A on a plane H. The rectangular parallelopiped 1001 has corners B1 to B8. For example, images as shown in FIG. 11 are obtained from the devices a1, a4, a7 and a10. In a case where the above expressions 2 and 3 are applied to these images, an image as if it is image-sensed from the central point A can be generated.

Figure 10:
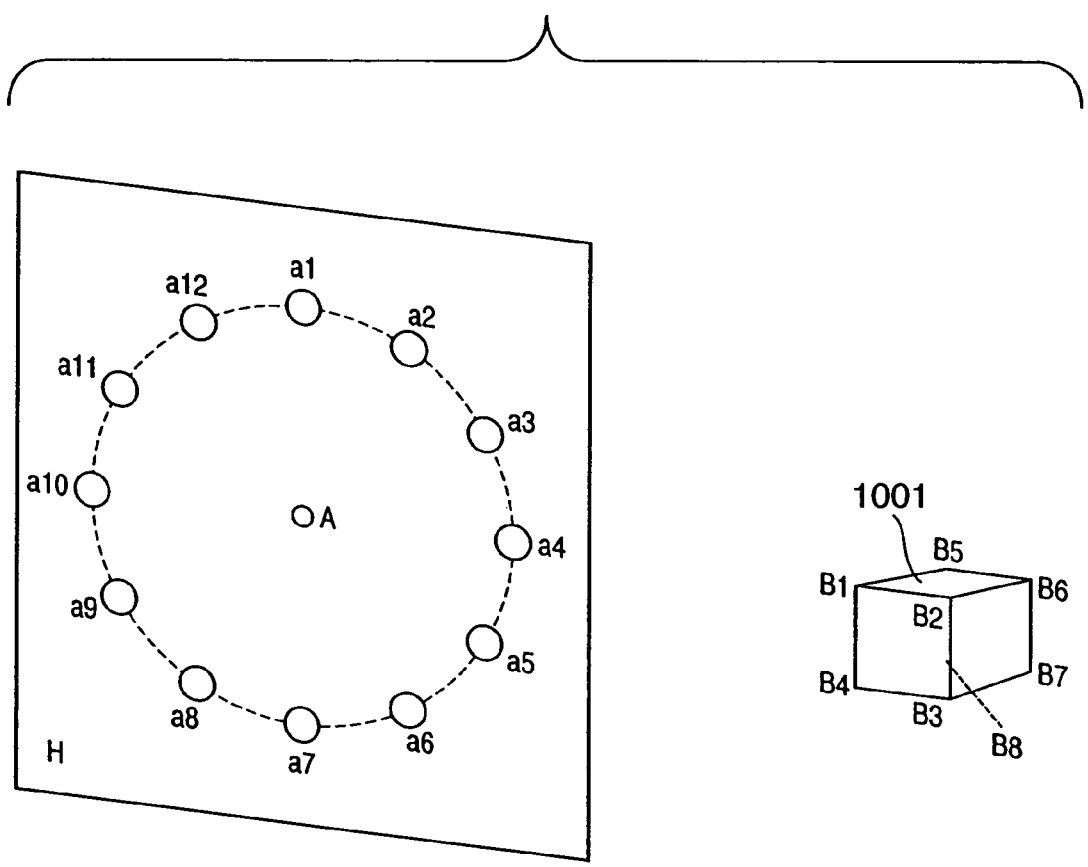
FIG. 10 is a schematic diagram showing another arrangement of the wireless image sensing apparatus 10.
Figure 11:
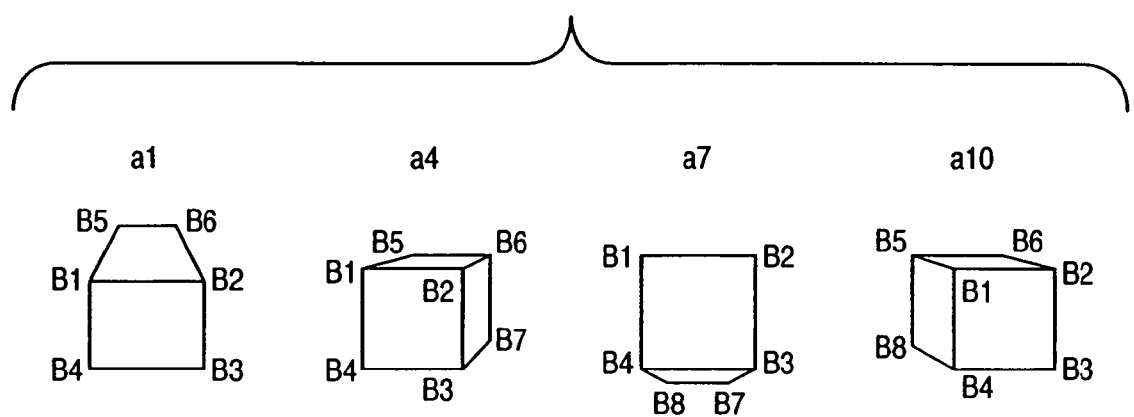
FIG. 11 is a schematic diagram showing an example of images obtained by the image sensing wireless devices 1.

However, in the case of FIG. 4, the object is only the point QE, however, in the case of three-dimensional object as shown in FIG. 10, point-to-point correspondence cannot be easily obtained. Accordingly, feature extraction processing is performed to extract feature points constituting the object before application of the above combining processing.

Figure 13A:
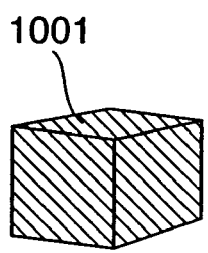
FIGS. 13A to 13C are schematic diagrams explaining feature-point extraction processing in a three-dimensional object according to the embodiments of the present invention.
Figure 13B:
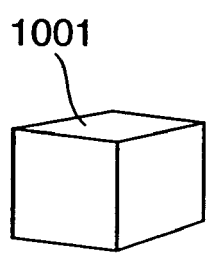
Figure 13C:
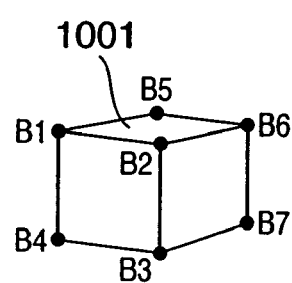

In the case of the rectangular parallelopiped 1001 as shown in FIG. 13A, first, rectangular outline extraction processing is performed to extract the outline (as shown in FIG. 13B) of the object (step S1401). The outline extraction is made by calculation processing (product calculation) between one of pixels constituting an image as a pixel of interest and 8 neighboring pixels. Further, intersections (feature points as shown in FIG. 13C) constituting respective outline segments are extracted from the extracted outline image (step S1402).

The extracted intersections are the corners B1 to B8 of the rectangular parallelopiped 1001. Regarding the corners B1 to B8, the coordinate positions (LxnBm, LynBm) on the image are calculated (in FIGS. 13A to 13C, n means 1 to 12, and m means 1 to 8) (step S1403). Note that in FIGS. 13A to 13C, although one of the 8 corners constituting the rectangular parallelopiped 1001 is hidden, however, the corner can be extracted in an image obtained from another angle and the coordinate positions of the respective corners can be calculated.

Next, it is determined whether or not the image sensing wireless devices 1 are point-symmetrically provided (step S1404). If it is determined that they are point-symmetrically provided (YES at step S1404), the process proceeds to step S1405, at which the coordinates (LxnBm, LynBm) of each feature point in a combined image are calculated in accordance with the expressions 2 and 3 regarding the coordinates (LxnBm, LynBm) of each feature point. On the other hand, if it is determined that the image sensing wireless devices 1 are not point-symmetrically provided (NO at step S1404), the process proceeds to step S1406, at which the coordinates (LxABm, LyABm) of each feature point in a combined image are calculated in accordance with the expressions 2 and 3, with weight information based on the location of the image sensing wireless devices 1, regarding the coordinates (LxnBm, LynBm) of each feature point.

In this manner, the coordinate positions of the respective feature points of the rectangular parallelopiped 1001 in the combined image can be obtained. Next, if the object has texture such as a color or pattern on its surface, texture information is reconstructed as follows (step S1407). First, respective points constituting a surface having the texture are obtained by the above-described feature point extraction processing. Next, the texture applied to the surface constituted with the feature points is extracted from the image obtained by image sensing.

Since the shape of the texture in the image obtained by image sensing is different from that in the combined image, to utilize the extracted texture in the combined image, deformation processing is performed based on the coordinate positions of the respective feature points in the combined image. First, a scaling ratio of the surface constituted with the feature points is calculated based on the differences between the coordinate positions in the image obtained by image sensing and those in the combined image. Then, scaling processing based on linear interpolation or the like is performed on the texture in accordance with the calculated scaling ratio, thus texture information to be used in the combined image is obtained.

Note that in the present embodiment, the number of images obtained by image sensing corresponds to the number of the image sensing wireless devices 1. Accordingly, the number of texture to be processed corresponds to the number of the image sensing wireless devices 1. However, in a case where an image subjected to excessive scaling processing is used as texture, visual unnaturalness occurs due to degradation of resolution or the like. For this reason, it is preferable to use texture information in an image with the minimum scaling ratio, i.e. the minimum difference between coordinate positions from those in a combined image.

Thus, the combined image is generated by utilizing the coordinate positions of the respective feature points of the rectangular parallelopiped 1001 in the combined image and the texture information mapped on the surfaces constituted with the feature points (step S1408).

Figure 12:
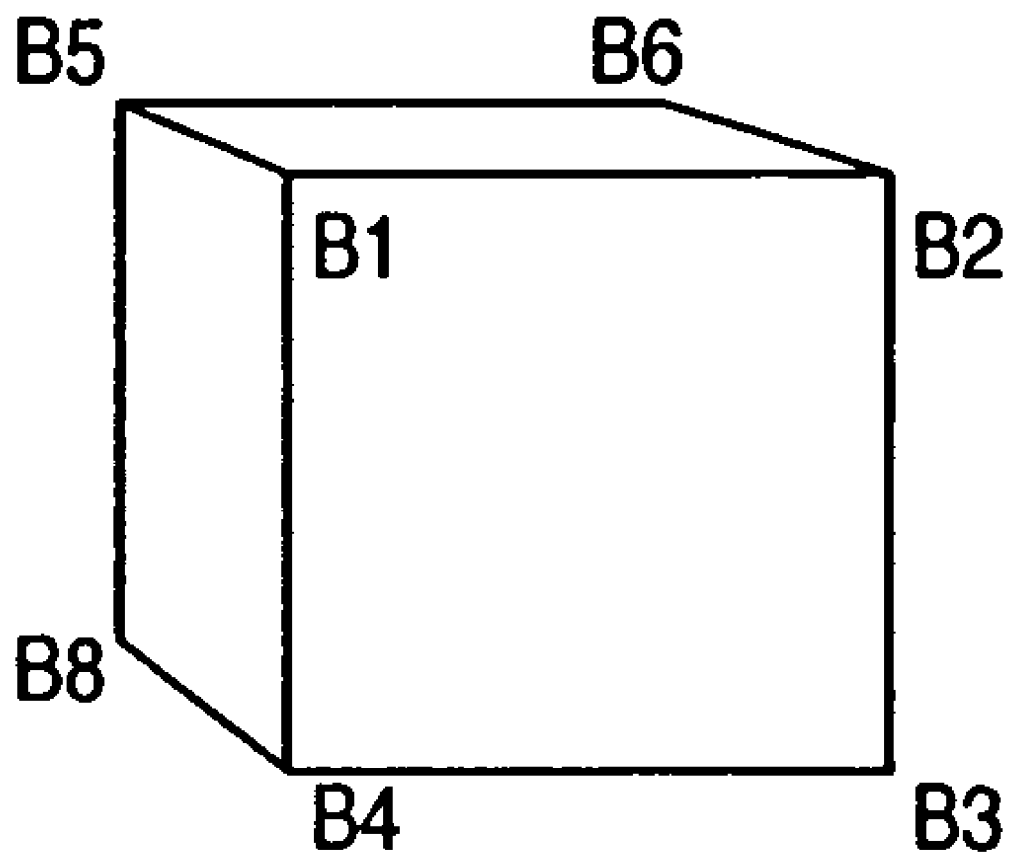
FIG. 12 is a schematic diagram showing an example of a combined image according to the embodiments of the present invention.

As described above, under the image sensing conditions in FIG. 10, outline extraction is performed on the images obtained from the devices a1 to a12 and the corners B1 to B8 are extracted, then calculation is performed based on the expressions 2 and 3, thus, the image of the rectangular parallelopiped 1001 viewed from the central point A is combined as shown in FIG. 12.

Note that in the present embodiment, in addition to the generation of the image viewed from the central point A, the distance between the object P and the point A can be calculated by detecting a shift between the image obtained by the device a1 and the image obtained by the device a7. By performing this image processing on all the image sensing wireless devices a1 to a12, the image viewed from the central point A can be accurately obtained, and further, the distance from the devices to the object can be accurately calculated.

Further, in a case where the image sensing wireless devices 1 are provided on the glasses 11 in FIG. 1, as a combined image can be generated as an image obtained from right and left view point positions, a stereoscopic system can be easily constructed by applying a combined image to a stereoscopic technique using lenticular lens, mirror, deflecting plate and color filter. In such case, if a head mounted display (HMD) is utilized, the same information as that obtained by the user of the glasses 11 can be provided to the user of the HMD.

Further, in a case where interpolation is performed on pixels specified with predetermined points in an combined image, which is generated from images obtained by image sensing from different view points, an image from a different view point from that of the generated combined image can be further generated.

Note that in the above example, the image sensing wireless devices 1 are circularly provided, however, the arrangement is not limited to this form but the devices may be arranged in a polygonal shape such as a rectangle or a hexagon. However, for the sake of conciseness of image processing, the above circular or square arrangement is preferable.

As the number of image sensing wireless devices 1 is large, the number of pixels of each image sensing wireless device can be reduced, and further, the accuracy of image processing can be improved. Accordingly, the number of image sensing wireless devices is preferably 12 or more, more preferably 50 or more, or further preferably 100 or more. However, considering that the labor of arranging the image sensing wireless devices 1 is increased and the entire cost is increased if the number of image sensing wireless devices is too large, the number of the image sensing wireless devices 1 is preferably 1000 or smaller, or more preferably 500 or smaller.

As the size of the image sensing wireless device 1 is very small, there is no limitation on the shape of the base member on which the image sensing wireless devices 1 are provided, therefore any base member can be used as the wireless image sensing apparatus 10. Further, as the size of the image sensing system is small, the sizes of the communication unit 102 and the power source unit 103 can be comparatively larger. Accordingly, the wireless image sensing apparatus 10 itself can be easily formed.

Second Embodiment

Figure 6:
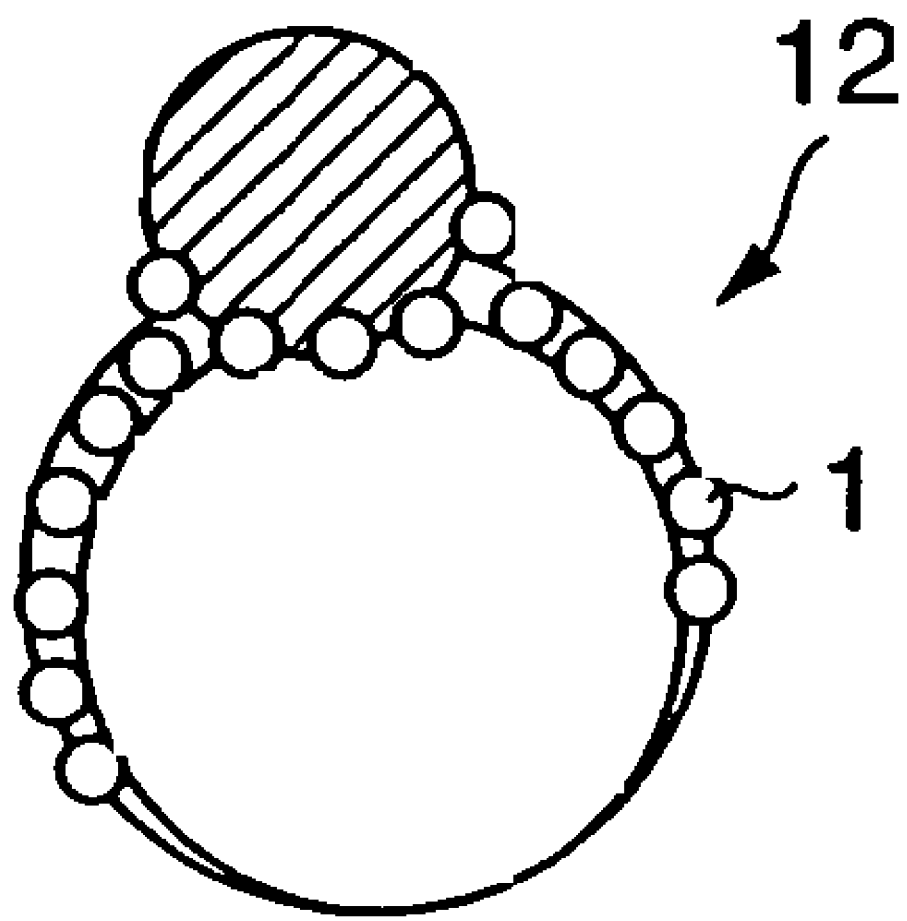
FIG. 6 is a schematic diagram showing an example of the structure of the wireless image sensing apparatus 10.
Figure 7:
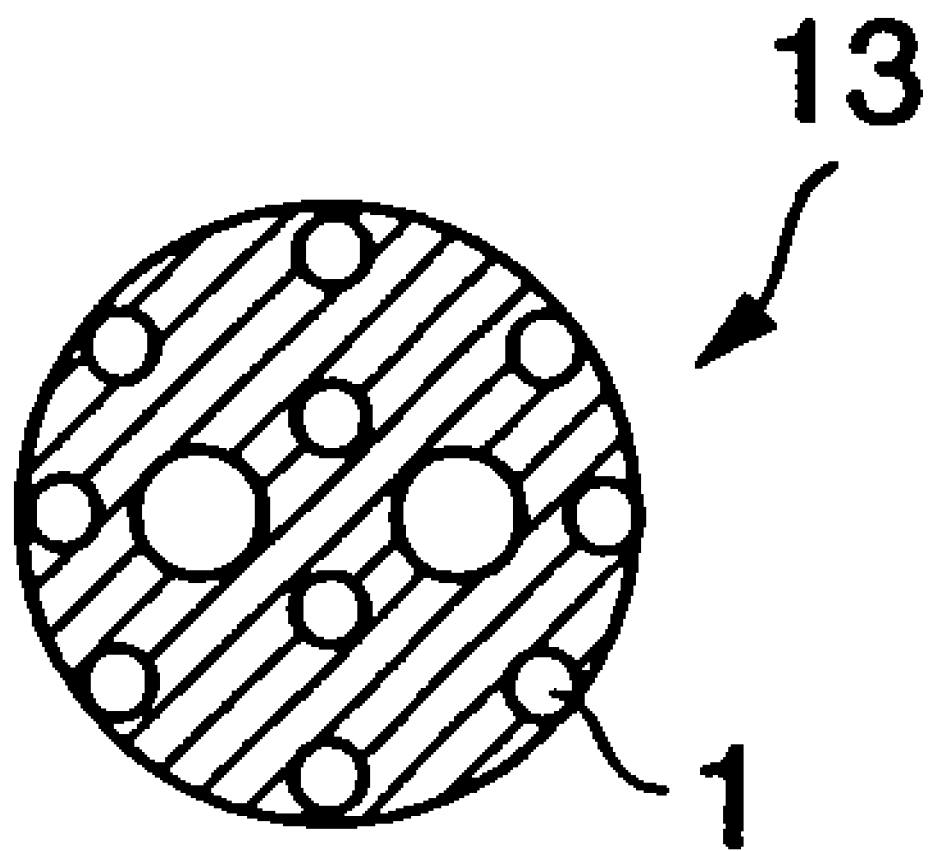
FIG. 7 is a schematic diagram showing another example of the structure of the wireless image sensing apparatus 10.

In the first embodiment, the image sensing wireless devices 1 are provided on the frame of the glasses 11 as the wireless image sensing apparatus 10. FIGS. 6 and 7 are schematic diagrams showing examples of the wireless image sensing apparatus 10 where the image sensing wireless devices 1 are mounted on various accessories.

FIG. 6 shows an example where the image sensing wireless devices 1 are attached to a ring 12 as a base member. In this case, close-up image sensing can be performed by moving a ringed finger closer to an object.

FIG. 7 shows an example where the image sensing wireless devices 1 are attached to a button 13 of a jacket or the like. As in the above case, close-up image sensing can be performed. Further, a necktie pin, a pierce, an emblem and the like may be employed as the wireless image sensing apparatus. In these cases, the very small image sensing wireless devices 1 are arranged as parts of decoration, and image sensing can be performed without user's consciousness of photographing and without object person's consciousness of being photographed.

Figure 8:
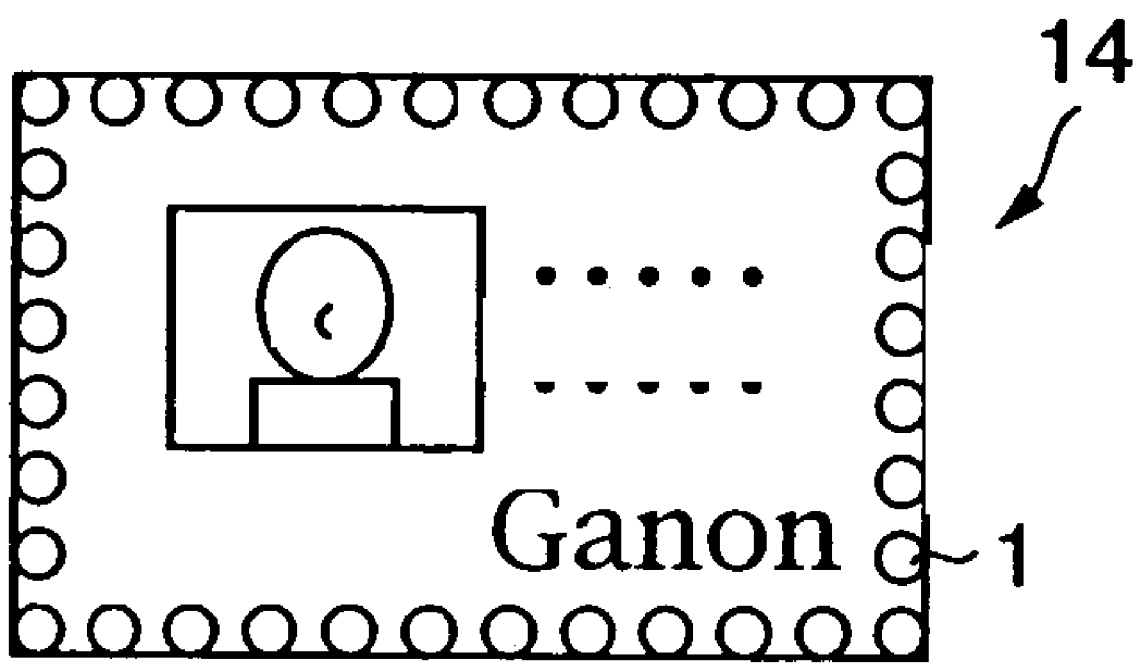
FIG. 8 is a schematic diagram showing another example of the structure of the wireless image sensing apparatus 10.

FIG. 8 is a schematic diagram showing another example where the image sensing wireless devices 1 are attached to an ID card 14 as a base member. The image sensing wireless devices 1 are attached to a frame of the ID card 14. when the ID card is dangled around the user's neck, image sensing is performed in an environment similar to the viewer's eye, and upon close-up image sensing, the ID card 14 is moved closer to an object.

Note that in these cases, the antenna and the processing circuit constituting the communication unit 102 may be installed in the accessory, however, they may be provided along the surface of a jacket or the like of the user.

Further, the transmission of images from the image sensing wireless devices 1 may be performed only when needed. For example, in the case where the image sensing wireless devices 1 are attached to a ring, it is preferable that a switch is turned ON/OFF by a hand movement.

As described above, the image sensing wireless devices 1 can be placed not only on glasses as shown in FIG. 1 but also on various accessories. Further, images obtained by the image sensing wireless devices 1 placed on the accessory are combined in the main base 20 and a combined image is generated as in the case of the first embodiment.

Note that for the sake of simplification of image combining processing in the main base 20, it is preferable that the image sensing wireless devices are point-symmetrically arranged as in the case of the button as shown in FIG. 7 and the card as shown in FIG. 8. In the case of the ring as shown in FIG. 6, as the image sensing wireless devices 1 arranged around a precious stone are point-symmetrically provided, the combined-image generation processing can be performed. Note that to obtain an image in a direction pointed with a ringed finger, it is necessary to weight coordinate positions of extracted feature points in correspondence with the positions of the image sensing wireless devices 1. The weighting is previously determined based on the positions of the image sensing wireless devices 1.

Third Embodiment

Figure 9:
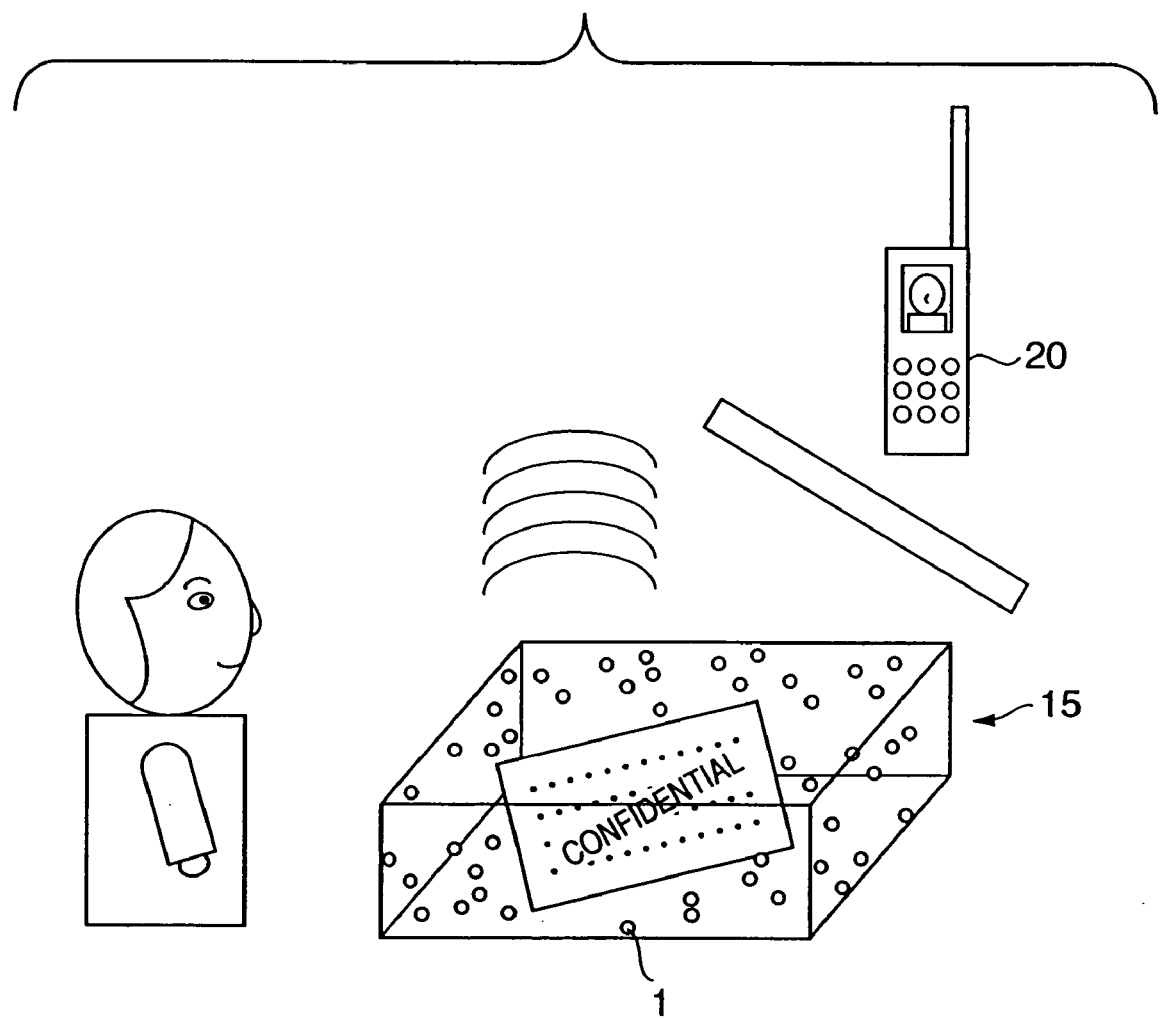
FIG. 9 is a schematic diagram showing another arrangement of the image processing system.

FIG. 9 is a schematic diagram showing another arrangement of the wireless image sensing apparatus 10. In this case, the inside of a case (box) 15 holding important documents such as deeds and/or great-price jewelry is studded with the image sensing wireless devices 1. This structure can perform automatic image sensing upon opening of the case 15.

For example, when a thief broke into a house steals a register book of apartment, a diamond accessory or the like, the thief's face is automatically image-sensed. Thus, the structure helps crime prevention.

In this manner, image sensing can be performed and image data can be stored without camera. Further, close-up image sensing and image sensing for crime-prevention can be performed.

Fourth Embodiment

A combined image generated in the above embodiments can be utilized as follows.

For example, in a case where a user wearing the glasses 11 in the first embodiment is appreciating pictures in a museum, a combined image generated by the main base 20 is transmitted to an information server in the museum via wireless communication or the like. Based on the received image information, the information server transmits detailed information on the appreciated picture as voice/text/image data to the main base 20. If the main base 20 has audio reproduction means such as a speaker, the received voice data can be reproduced for the user. Further, the received text data and image data are displayed on the display unit 115 for the user.

Similarly, upon appreciation of historical architectures and cultural assets at travel destinations, explanatory information can be obtained as voice/image/text information.

Further, in a case where a user is doing his/her shopping, the image of an article attracted the user's attention is transmitted via the main base 20 to an information server in the shop or a server on an external network. Then detailed information on the article (e.g., price, brand, and further, information as to whether it is genuine/bogus) can be obtained from the server.

Further, a combined image generated in the image processing system of the present invention can be utilized by not only a single user but also many other users. For example, a driver stuck in a traffic jam is provided with an image obtained from the viewpoint of a driver at the head of the slow traffic, thereby the cause of traffic jam can be obtained. Further, it may be arranged such that position information is obtained by GPS and a combined image is provided to a user who needs an image in a predetermined position.

Further, in a case where a wavelength selection filter is added to the respective image sensing wireless devices 1, a function of briefly analyzing an object can be provided. For example, if a danger can be detected by color change as in the case of infrared temperature detection, a danger state can be detected based on color change in a combined image and warning to a user can be made. Further, it may be arranged such that the distance from an object is detected by a binocular function, and an alarm is issued when the distance is equal to or shorter than a predetermined distance.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (a DVD-ROM, a DVD-R and a DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. An image processing system comprising:
   an image sensing unit having plural image sensing devices to perform image sensing and output image data;
   a wireless transmission unit to wireless-transmit the plural image data outputted from said image sensing unit; and
   a combined image generation unit to generate a combined image by using the wireless-transmitted plural image data,
   wherein said image sensing devices are provided point-symmetrically with respect to a first point,
   said combined image generation unit comprising:
   a reception unit to receive the wireless-transmitted plural image data;
   an outline extraction unit to extract plural outline segments of an object from the received plural image data;
   a feature point extraction unit to extract plural feature points constituting the extracted plural outline segments, wherein the feature points are intersections of the extracted plural outline segments;
   a coordinate determination unit to determine coordinates of the feature points of said object in case of image sensing in said first point, from coordinates of the extracted plural feature points; and
   an image generation unit to generate an image of said object in case of image sensing in said first point, based on the determined coordinates of the feature points, and
   if said object has texture, said combined image generation unit generates texture in the combined image by utilizing the coordinates of the extracted plural feature points, the determined coordinates of the feature points and texture information of such an image obtained by image sensing that has the minimum difference between coordinates of the feature points in the captured image and in combined image, in the received plural image data.

2. An image processing system comprising:
   an image sensing unit having plural image sensing devices to perform image sensing and output image data;
   a wireless transmission unit to wireless-transmit the plural image data outputted from said image sensing unit; and
   a combined image generation unit to generate a combined image by using the wireless-transmitted plural image data,
   wherein said combined image generation unit comprises:

a reception unit to receive the wireless-transmitted plural image data;

an outline extraction unit to extract plural outline segments of an object from the received plural image data;

a feature point extraction unit to extract plural feature points constituting the extracted plural outline segments, wherein the feature points are intersections of the extracted plural outline segments;

a coordinate determination unit to determine coordinates of the feature points of said object in case of image sensing in a second point, from coordinates of the extracted plural feature points and weight information of each of the plural image sensing devices; and an image generation unit to generate an image of said object in case of image sensing in said second point, based on the determined coordinates of the feature points, said coordinate determination unit performs weighting on the respective extracted feature points, based on coordinates of the extracted plural feature points and coordinates of said second point, so as to determine the coordinates of the feature points of said object in case of image sensing in said second point; and if said object has texture, said combined image generation unit generates texture in the combined image by utilizing the coordinates of the extracted plural feature points, the determined coordinates of the feature points and texture information of such an image obtained by image sensing that has the minimum difference between coordinates of the feature points in the captured image and in combined image, in the received plural image data.

3. An image processing method comprising:

an image sensing step of performing image sensing and output image data by an image sensing unit having plural image sensing devices;

a wireless transmission step of wireless-transmitting the plural image data outputted at said image sensing step; and a combined image generation step of generating a combined image by using the wireless-transmitted plural image data, wherein said image sensing devices are provided point-symmetrically with respect to a first point, said combined image generation step comprising:

a reception step of receiving the wireless-transmitted plural image data;

an outline extraction step of extracting plural outline segments of an object from the received plural image data;

a feature point extraction step of extracting plural feature points constituting the extracted plural outline segments, wherein the feature points are intersections of the extracted plural outline segments;

a coordinate determination step of determining coordinates of said feature points of said object in case of image sensing in said first point, from coordinates of the extracted plural feature points; and an image generation step of generating an image of said object in case of image sensing in said first point, based on the determined coordinates of the feature points, if said object has texture, at said combined image generation step, texture in the combined image is generated by utilizing the coordinates of the extracted plural feature points, the determined coordinates of the feature points and texture information of such an image obtained by image sensing that has the minimum difference between coordinates of the feature points in the captured image and in combined image, in the received plural image data.

4. An image processing method comprising:

an image sensing step of performing image sensing and output image data by an image sensing unit having plural image sensing devices;

a wireless transmission step of wireless-transmitting the plural image data outputted at said image sensing step; and a combined image generation step of generating a combined image by using the wireless-transmitted plural image data, wherein said combined image generation step comprises:

a reception step of receiving the wireless-transmitted plural image data;

an outline extraction step of extracting plural outline segments of an object from the received plural image data;

a feature point extraction step of extracting plural feature points constituting the extracted plural outline segments, wherein the feature points are intersections of the extracted plural outline segments;

a coordinate determination step of determining coordinates of said feature points of said object in case of image sensing in a second point, from coordinates of the extracted plural feature points and weight information of each of the plural image sensing devices; and an image generation step of generating an image of said object in case of image sensing in said second point, based on the determined coordinates of the feature points, in said coordinate determination step, weighting is performed on the respective extracted feature points, based on coordinates of the extracted plural feature points and coordinates of said second point, so as to determine the coordinates of the feature points of said object in case of image sensing in said second point; and if said object has texture, at said combined image generation step, texture in the combined image is generated by utilizing the coordinates of the extracted plural feature points, the determined coordinates of the feature points and texture information of such an image obtained by image sensing that has the minimum difference between coordinates of the feature points in the captured image and in combined image, in the received plural image data.

* * * * *

UNITED STATES PATENT AND TRADEMARK OFFICE
CERTIFICATE OF CORRECTION

PATENT NO. : 7,277,125 B2  Page 1 of 1
APPLICATION NO. : 10/744753
DATED : October 2, 2007
INVENTOR(S) : Naoki Nishimura et al.

It is certified that error appears in the above-identified patent and that said Letters Patent is hereby corrected as shown below:

Column 2, line 61-62, delete "farsightedn ss" and insert --farsightedness--

Column 3, line 45, delete "can b" and insert --can be--

Column 5, line 30-31, delete "head r" and insert --header--

Signed and Sealed this

Fifteenth Day of July, 2008

JON W. DUDAS
*Director of the United States Patent and Trademark Office*